(12) United States Patent
Saxena

(10) Patent No.: US 8,286,786 B1
(45) Date of Patent: Oct. 16, 2012

(54) FABRIC BELTING FOR CONVEYOR BELTS

(75) Inventor: Vineet Saxena, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 369 days.

(21) Appl. No.: 12/547,692

(22) Filed: Aug. 26, 2009

Related U.S. Application Data

(60) Provisional application No. 61/092,431, filed on Aug. 28, 2008.

(51) Int. Cl.
  *B65G 15/34* (2006.01)
  *B32B 3/28* (2006.01)
(52) U.S. Cl. .......... 198/844.1; 198/847; 428/313.3; 428/909
(58) Field of Classification Search .......... 198/847, 198/844.1, 803.14, 803.15; 156/77, 137, 156/141; 474/268, 271; 428/313.3, 313.5, 428/908.9, 909
See application file for complete search history.

(56) References Cited

U.S. PATENT DOCUMENTS

| | | | | |
|---|---|---|---|---|
| 3,426,388 A | * | 2/1969 | Prohaska | 425/453 |
| 3,656,360 A | * | 4/1972 | Fix | 474/250 |
| 4,140,485 A | * | 2/1979 | Silverman | 432/239 |
| 4,276,039 A | * | 6/1981 | Takano | 474/205 |
| 4,316,536 A | * | 2/1982 | Verbeek | 198/699 |
| 4,364,887 A | * | 12/1982 | Becht et al. | 264/166 |
| 4,371,580 A | | 2/1983 | Morrison et al. | |
| 4,518,647 A | | 5/1985 | Morrison | |
| 4,650,068 A | * | 3/1987 | Vanassche et al. | 198/847 |
| 4,678,455 A | * | 7/1987 | Hollaway, Jr. | 474/263 |
| 4,745,023 A | * | 5/1988 | Chapman et al. | 442/183 |
| 4,877,126 A | * | 10/1989 | van Calker et al. | 198/847 |
| 4,946,731 A | * | 8/1990 | Dutt | 428/156 |
| 5,044,098 A | * | 9/1991 | Berghefer | 37/232 |
| 5,066,344 A | * | 11/1991 | Inami et al. | 156/138 |
| 5,129,866 A | * | 7/1992 | Schanin et al. | 474/264 |
| 5,164,241 A | * | 11/1992 | Andre De La Porte et al. | 428/97 |
| 5,238,537 A | * | 8/1993 | Dutt | 162/358.4 |
| 5,626,723 A | * | 5/1997 | Schiel et al. | 162/358.4 |
| 6,214,438 B1 | * | 4/2001 | Prick | 428/117 |
| 6,258,400 B1 | * | 7/2001 | Brehant et al. | 427/2.14 |
| 6,428,874 B1 | * | 8/2002 | McGahern et al. | 428/167 |
| 6,540,069 B2 | * | 4/2003 | Tschantz | 198/844.1 |
| 6,561,344 B1 | * | 5/2003 | Basse | 198/844.1 |
| 6,572,505 B1 | * | 6/2003 | Knutson | 474/260 |
| 6,848,571 B2 | * | 2/2005 | Allen et al. | 198/844.2 |
| 6,966,959 B2 | * | 11/2005 | Yanadori et al. | 156/137 |
| 7,124,879 B1 | * | 10/2006 | Maguire | 198/690.2 |
| 7,182,202 B2 | * | 2/2007 | Kalverkamp | 198/844.1 |
| 7,419,050 B2 | * | 9/2008 | Westerkamp et al. | 198/847 |
| 7,704,131 B1 | * | 4/2010 | Malenke et al. | 452/46 |
| 7,866,069 B2 | * | 1/2011 | Bayo Molla | 38/8 |

\* cited by examiner

*Primary Examiner* — Douglas Hess

(74) *Attorney, Agent, or Firm* — Dicke, Billig & Czaja, PLLC

(57) ABSTRACT

Belting for use in a conveyor belt that includes a fabric base and a rubber coat. The fabric base has an upper surface and a lower surface. At least one of the upper surface and the lower surface has a plurality of depressions formed therein. The rubber coat is applied to at least one of the upper surface and the lower surface having the plurality of depressions formed therein.

19 Claims, 4 Drawing Sheets

FABRIC BELTING FOR CONVEYOR BELTS

REFERENCE TO RELATED APPLICATION

This application claims priority to U.S. Provisional Application No. 61/092,431, which was filed on Aug. 28, 2008, the contents of which are incorporated herein by reference.

FIELD OF THE INVENTION

The invention relates generally to conveyor belts. More particularly, the patent application relates to fabric belting for conveyor belts.

BACKGROUND OF THE INVENTION

Because of their ability to move large amounts of material, conveyor belts have been long been used in industry such as for moving agricultural products, rocks and other mined materials and various manufactured products.

One area in which conveyor belts are extensively usjod is equipment for moving agricultural products and, in particular, agricultural equipment that is used for harvesting. Wide-aspect belts are extensively used in farm machinery, especially harvesting implements, examples of which are discussed in U.S. Pat. Nos. 4,371,580 and 4,518,647.

A farm implement known as a swather may be provided with an elongated cutter bar to cut grass, wheat, oats, barley, rice, canola or other grains. Conveyor belts known as draper belts are located behind the cutter bar to convey the cut materials to crimp rollers or other processing subsystems, or to the ground.

In addition to the forces associated with moving the products placed on the draper belts that place strains on these items, the draper belts may be exposed to adverse environmental conditions such as high and low operating temperatures that potentially shorten the useful operation life of the draper belts.

SUMMARY OF THE INVENTION

An embodiment of the invention is directed to fabric belting for use in conveyor belts. The fabric belting is fabricated from a fabric base and a rubber coat. The fabric base has an upper surface and a lower surface. At least one of the upper surface and the lower surface has a plurality of depressions formed therein. The rubber coat is applied to at least one of the upper surface and the lower surface having the plurality of depressions formed therein.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

As noted above, conveyor belts are used in a wide variety of applications because the conveyor belts enable large amounts of product to be efficiently moved. In addition to criteria such as length and width of the conveyor belt and the size and placement of cleats on the conveyor belt, an important factor in designing the conveyor belt is the tensile strength of the conveyor belt so that the conveyor belt has sufficient strength to support the load placed thereon as well as the forces associated with the material being placed on the conveyor belt.

Conveyor belts generally include two primary components: (1) a fabric base and (2) a rubber coat. Depending on the use application, cleats may be attached to the conveyor belts in a spaced-apart configuration. The height of the cleats and the spacing between the cleats may be selected based upon a variety of factors such as the product that is being moved on the conveyor.

The fabric base is generally provided in two configurations—spun and filament. Spun fabric is made from staple fibers that are spun to produce the strands, which are then woven to produce the spun fabric. Filament fabric, on the other hand, is formed from continuous extruded filament threads. Even though the weight of filament fabric and spun fabric with otherwise similar characteristics are approximately the same for a given area, the filament fabric has a strength that is at least two times greater than the spun fabric.

In certain markets, the fabric base is sold based on weight. In such a market, the fabric base used in conjunction with the present invention provides enhanced strength of the product without an increase in the prices of the fabric base.

While filament fabric is generally viewed as being stronger than spun fabric, in certain applications, the filaments used to produce the filament fabric are too smooth, which presents challenges when applying the rubber coat to the fabric base.

Figure 1:
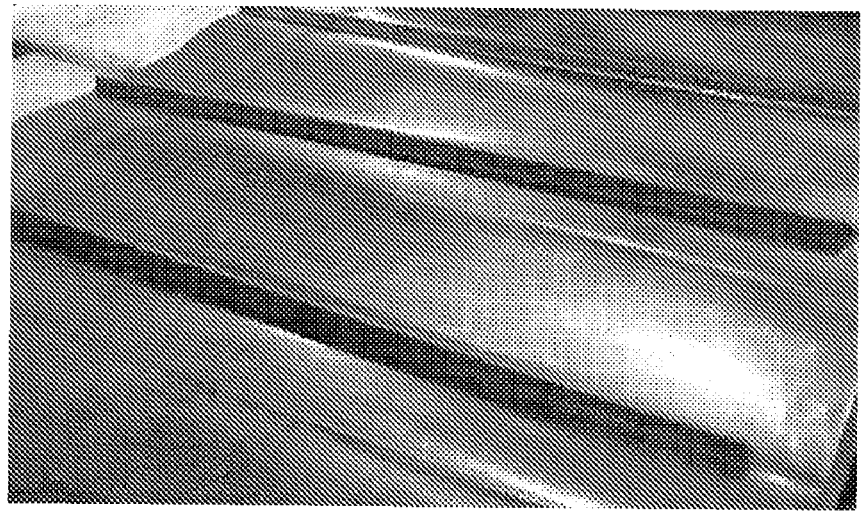
FIG. 1 is a perspective view of a prior art material used for fabricating a conveyor belt.

The prior art fabric bases used in fabricating belting have a relatively consistent weave pattern that produces a relatively smooth surface when calendered with rubber. An example of one such rubber coated belting material is illustrated in FIG. 1.

There are two primary techniques in which the fabric base is coated with rubber—skim coating and friction coating. With skim coating, a layer of rubber material is laid on a fabric base but is not forced into the weave on the fabric base. In contrast, friction coating applies rubber to a fabric base using a calender with rolls running at different surface speeds to urge the rubber into the weave on the fabric base.

While skim coating is typically viewed as being suitable for use in conjunction with a variety of fabrics, the layer of rubber provided by skim coating is typically much thicker than the layer of rubber that is provided by friction coating.

The thicker rubber layer produced from skim coating increases the weight of the conveyor belts that contain the skim coated belting material. This extra weight restricts the capacity of the conveyor belts that contain the skim coated rubber. Alternatively, the components of the conveyor belts that contain the skim coated rubber would need to be fabricated with a higher capacity.

However, it has been previously not possible to friction coat a filament fabric base because the surface of the filaments was too smooth for the rubber to form a strong bond with the filaments during the friction coating process.

Depending on the intended use of the belting material 10, it is possible to coat one or both of the fabric base 14 surfaces with rubber. It is also possible to use different coating techniques during the coating process. For example, friction coating may be used on one side and skim coating may be used on the other side.

It has been discovered that a filament fabric could be friction coated with rubber if the surface of the filament fabric has a series of depressions formed therein. For applications where both sides of the fabric are coated with rubber, depressions may be present on both sides of the filament fabric to ensure strong bonding of the rubber to the filament fabric that is to be coated on both sides.

Increasing the surface area of the depressions increases adhesion of the rubber to the filament fabric. A depth of the depressions may be at least 0.01 inches. In certain embodiments, the depressions may have a depth of about 0.03 inches.

The depressions 12 may occupy at least 30 percent of the surface area of the filament fabric base 14. In certain embodiments, the depressions 12 occupy at least 50 percent of the surface area of the filament fabric base 14. In other embodiments, the depressions 12 occupy at least 70 percent of the surface area of the filament fabric base 14. When it is desired to skim coat rubber on both sides of the filament fabric base 14, the depressions 12 on each surface of the filament fabric base 14 may occupy about 50 percent of the surface area of the filament fabric base 14.

Figure 2:
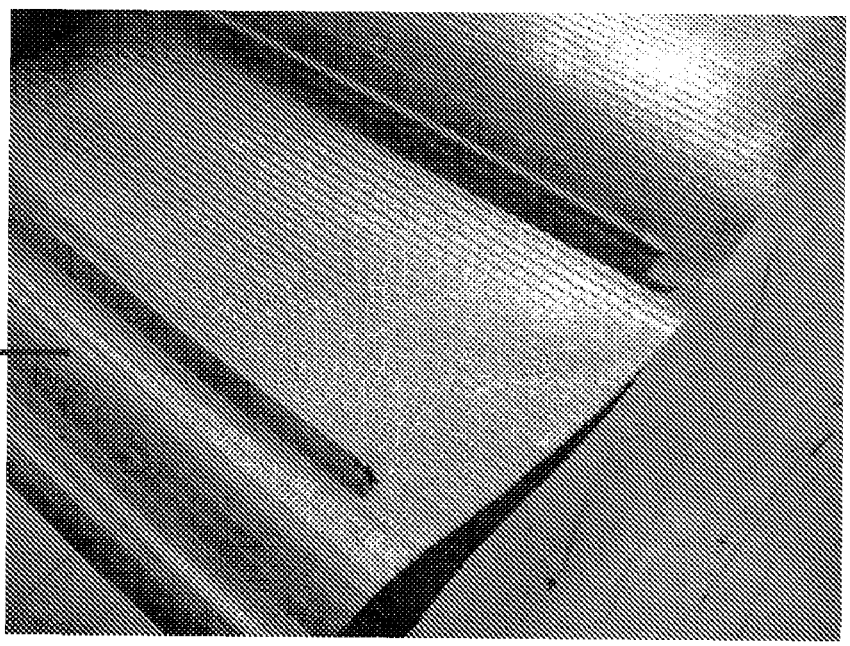
FIG. 2 is a perspective view of a fabric belting for use in a conveyor belt.
Figure 3:
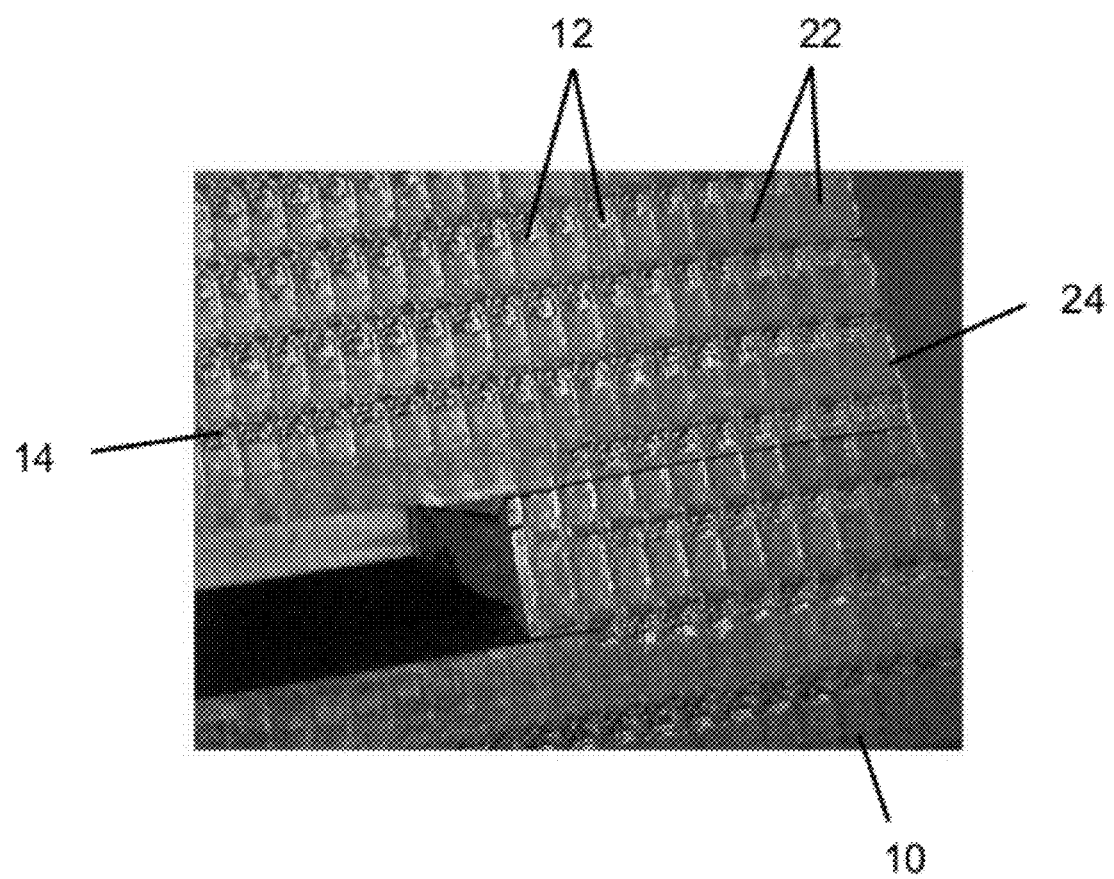
FIG. 3 is an enlarged perspective view of the fabric belting.

The depressions 12 utilized in conjunction with the filament fabric may take a variety of configurations. Examples of depression 12 shapes include squares, rectangles, diamonds, circles and hexagons. An example of one configuration for the depressions 12 on the fabric base 14 is illustrated in FIGS. 2 and 3. While the description set forth herein primarily focuses on the use of filament fabric, it is possible to also use spun fabric that has depressions 12 formed therein.

Figure 4:
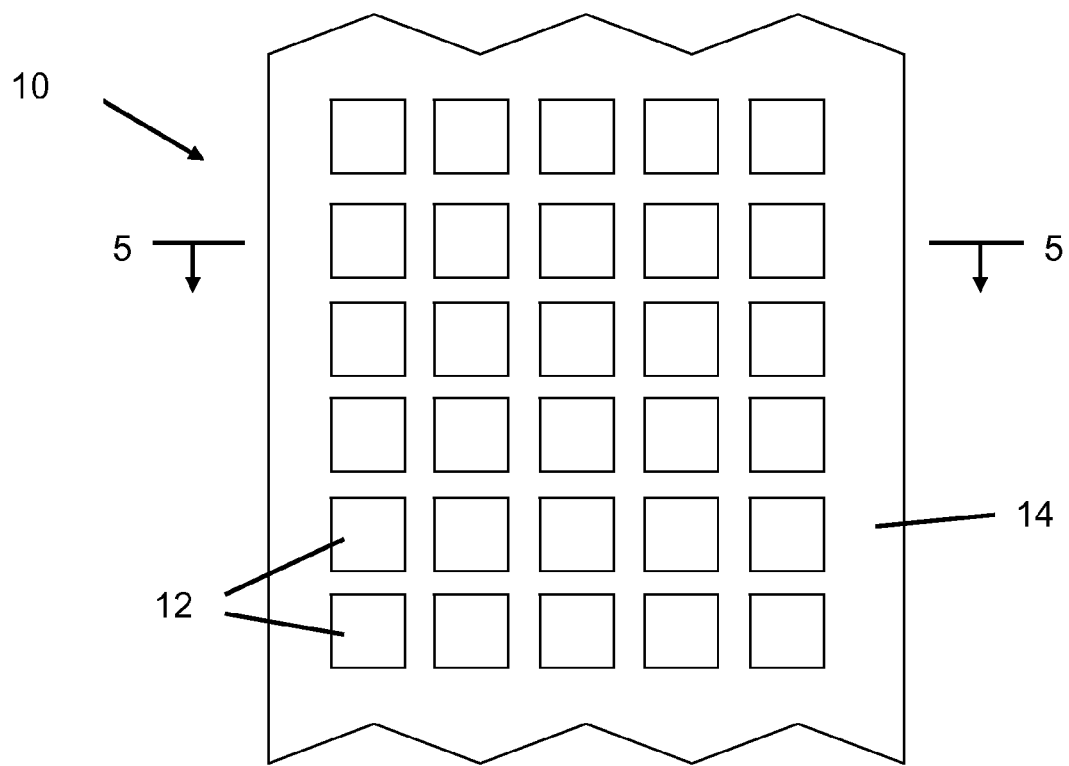
FIG. 4 is a top view of the fabric belting that includes square shaped depressions according to an embodiment of the invention.
Figure 5:
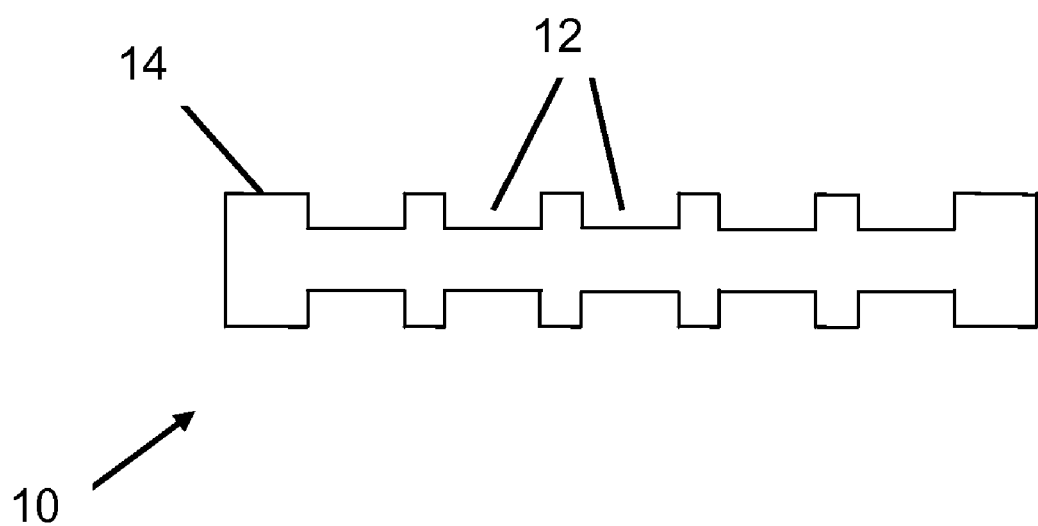
FIG. 5 is a sectional view of the fabric belting taken along a line 5-5 in FIG. 4.

Another example of the depressions 12 on the belting 10 is illustrated in FIGS. 4-5. In this embodiment, the depressions 12 that are formed on the fabric base 14 have a square configuration and are arranged in an array.

As an alternative to using a weaving pattern that produces the preceding depressions, it is possible to utilize other techniques for forming the discontinuities in the surfaces of the fabric. Examples of such techniques include using a twill weave and utilizing different diameters of filaments or grouping the filaments.

While it is possible for the concepts of the invention to be used in conjunction with various rubber compositions, in certain embodiments, the rubber coating is styrene butadiene rubber.

Prior to coating the fabric base with rubber, the fabric base may be treated to enhance the rubber adhesion, an example of which includes applying a layer of resorcinol formaldehyde latex to the surface of the fabric base. After the rubber has been coated on the fabric base, it is possible to use additional techniques to increase the strength and/or durability of the rubber, examples of which include pressure and heat.

After the rubber is coated on the fabric base 14, the rubber coat 24 has a plurality of depressions 22 that are aligned with the plurality of depressions 12 in the fabric base 14, as illustrated in FIG. 3, because the rubber coat 24 partially fills the plurality of depressions 12 in the fabric base 14. The plurality of depressions 22 in the rubber coat 24 thereby have a shape that is similar to the shape of the plurality of depressions 12 in the fabric base 14.

Because of the strength of the friction coated filament fabric, it is generally not necessary to use a hem or reinforced edge on a conveyor belt fabricated using the concepts of this invention. An advantage of forming the conveyor belt without the hem or reinforced edge is that the potential of uneven wear on the rubber rollers that support the conveyor belt is eliminated.

However, in certain embodiments, it is possible to provide a hem or reinforced edge on the fabric to enhance the stiffness of the fabric. If a hem or reinforced edge is provided on the fabric, it is possible for the hem or reinforced edge to be provided on the upper and/or lower surfaces. It is also possible for the hem or reinforced edge to be formed by folding over an edge portion of the fabric or by attaching a second strip of fabric to the fabric.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. Belting for use in a conveyor belt, wherein the belting comprises:
   a fabric base having an upper surface and a lower surface, wherein at least one of the upper surface and the lower surface has a plurality of depressions formed therein and wherein the plurality of depressions are each formed in a shape of a circle, square, diamond, hexagon or combination thereof; and
   a rubber coat applied to at least one of the upper surface and the lower surface having the plurality of depressions formed therein wherein the rubber coat has a plurality of depressions formed therein and wherein the plurality of depressions in the rubber coat are aligned with the plurality of depressions in the fabric base.

2. The belting of claim 1, wherein the fabric base is fabricated from filament thread, spun thread or combination thereof.

3. The belting of claim 1, wherein the plurality of depressions each have a depth of at least about 0.01 inches.

4. The belting of claim 1, wherein the plurality of depressions have a total surface area that is at least about 30 percent of a total surface area of the fabric base.

5. The belting of claim 1, wherein the plurality of depressions each have a substantially similar shape.

6. The belting of claim 1, wherein the fabric base is formed by weaving together a plurality of threads, wherein the plurality of threads include a first set of threads and a second set of threads and wherein the first set of threads has a diameter that is different than the second set of threads.

7. The belting of claim 1, wherein the fabric base is treated to enhance adhesion of the rubber coat using at least one of a coating layer applied over the fabric base, a pressure treatment, a heat treatment or combination thereof.

8. The belting of claim 1, wherein the rubber coat is applied using friction coating, skim coating or combination thereof.

9. The belting of claim 1, and further comprising treating the fabric base to enhance adhesion of the rubber coat using at least one of a coating layer applied over the fabric base, a pressure treatment, a heat treatment or combination thereof.

10. The belting of claim 1, wherein the rubber coat is applied using friction coating, skim coating or combination thereof.

11. A method of forming belting for use in a conveyor belt, wherein the method comprises:
    providing a fabric base having an upper surface and a lower surface, wherein at least one of the upper surface and the lower surface has a plurality of depressions formed therein; and
    applying a rubber coat to at least one of the upper surface and the lower surface having the plurality of depressions formed therein.

12. The method of claim 11, and further comprising fabricating the fabric base from filament thread, spun thread or combination thereof.

13. The method of claim 11, and further comprising forming the plurality of depressions each with a depth of at least about 0.01 inches.

14. The method of claim 11, wherein the plurality of depressions have a total surface area that is at least about 30 percent of a total surface area of the fabric base.

15. The method of claim 11, and further comprising forming the plurality of depressions each with a substantially similar shape.

16. The method of claim 11, and further comprising forming the plurality of depressions in a shape of a circle, square, diamond, hexagon or combination thereof.

17. The method of claim 11, and further comprising forming the fabric base by weaving together a plurality of threads, wherein the plurality of threads include a first set of threads and a second set of threads and wherein the first set of threads has a diameter that is different than the second set of threads.

18. Belting for use in a conveyor belt, wherein the belting comprises:
    a fabric base having a surface, wherein the surface has a plurality of depressions formed therein and wherein the plurality of depressions have a total surface area that is at least about 30 percent of a total surface area of the fabric base; and
    a rubber coat applied the surface.

19. The belting of claim 18, wherein the fabric base is fabricated from filament thread, spun thread or combination thereof.

\* \* \* \* \*